United States Patent [19]

Hosler et al.

[11] 4,353,686

[45] Oct. 12, 1982

[54] APPARATUS FOR AIR-LAYER FIBROUS WEBS

[75] Inventors: John F. Hosler; Paul W. White, both of Cincinnati, Ohio

[73] Assignee: Formica Corporation, Wayne, N.J.

[21] Appl. No.: 226,347

[22] Filed: Jan. 19, 1981

[51] Int. Cl.[3] .......... B29J 1/00

[52] U.S. Cl. .......... 425/83.1

[58] Field of Search .......... 425/83.1

[56] References Cited

U.S. PATENT DOCUMENTS

| | | | |
|---|---|---|---|
| 4,014,635 | 3/1977 | Kroyer | 425/83.1 |
| 4,097,209 | 6/1978 | Garrick et al. | 425/83.1 |
| 4,112,549 | 9/1978 | Min et al. | 425/83.1 |
| 4,157,724 | 6/1979 | Persson | 425/83.1 |
| 4,193,751 | 3/1980 | Miller | 425/83.1 |
| 4,212,607 | 7/1980 | Miller | 425/83.1 |

*Primary Examiner*—James R. Hall

*Attorney, Agent, or Firm*—Frank M. Van Riet

[57] ABSTRACT

An apparatus for the production of fibrous webbed products wherein a suction box is situated beneath a foraminous belt, damper means are provided whereby rollers positioned below the belt are maintained in a clean condition and the space between a roller and its next adjacent member is altered, to control the air flowing through said space.

4 Claims, 2 Drawing Figures

APPARATUS FOR AIR-LAYER FIBROUS WEBS

BACKGROUND OF THE INVENTION

The production of fibrous, webbed products whereby fibers are laid down on a moving foraminous belt from a mixture of air is well known. Apparatus for the production of such webbed products generally comprises a fiber distributor having an inlet means therein for introducing the air-fiber stream, a permeable bottom wall and stirring means which move parallel to the bottom wall. A foraminous forming wire is positioned immediately below the fiber distributor and a suction box is situated below the wire in order to draw down the fibers onto the wire and hold them in place. The wire normally is supported along its length by rollers which are positioned below it and in the suction box, especially when a plurality of distributors are employed and each distributor has a plurality of stirring means associated therewith. Such an area of the apparatus is usually called the forming head. In order to insure the complete association of the fibers which are laid-down on the wire, it is oftimes desirable to introduce a binder with the air and fibers admitted into the distributors. These binders are normally added in the form of particles although they may also be used as liquids which are either sprayed onto the individual fibers or the web per se after it is formed, see U.S. Pat. No. 4,014,635.

In apparatus of the type described above, it is necessary to control a great variety of different variables in order to produce webs of optimum physical characteristics across their entire cross-section, such as basis weight, etc. One problem which has been continually faced in producing webs of this type is that the forming rate varies in the machine direction under the forming head in relation to the suction box during the continuous operation of the apparatus to the extent that the density, basis weight, surface properties, etc. of the formed web are not uniform. The forming rate is a direct function of the air velocity through the foraminous wire which, in part, is a function of the suction box. As the web is formed, the thicker it becomes, and the less air passes through it. Attempts to control the air rate through the web have included modifying the suction box so that more draw is created at the end thereof over which the thicker section of the web is passing. When a plurality of distributors are employed, such modifications of the suction box do not provide the control of air flow necessary to create a web with a substantially ripple-free surface, constant basis weight, cross-section density, etc.

Furthermore, when a solid binder is used, the draw of the suction box tends to pull particles thereof through the web and into the box where the rollers supporting the foraminous wire become contaminated. This contamination affects the efficiency of the rollers and also disturbs the path of the foraminous wire passing thereover.

SUMMARY OF THE INVENTION

An apparatus has now been provided whereby the forming rate on the foraminous rate of the dry forming of fibrous webs is controlled by controlling the velocity of the air through the wire. By the use of damping means in association with the wire support rollers, independent control of the suction to individual sections of the forming wire can be attained, thus optimizing output and uniformity Additionally, the dampers are constructed such that the blade portion thereof contacts the rollers and removes artifacts therefrom resulting from the forming operation.

As mentioned above, a certain velocity through the wire and web is necessary in order to form a web of optimum properties. Since the web situated on the foraminous wire at any particular part above the suction box varies in thickness in the machine direction, variations are required in the pressure loss under the wire to form a uniform or controlled air velocity. The damper means of the instant invention performs such a function. Without the damper means, the air velocity is decreased and this decrease allows the horizontal flow of air under the wire caused by the stirrers to predominate and surface ripples are formed and the quantity of web forming is reduced from the maximum achievable.

DESCRIPTION OF THE INVENTION INCLUDING PREFERRED EMBODIMENTS

The appartus of the present invention comprises (A) a distributor housing having an inlet and a permeable bottom wall, (B) a plurality of distributor means within said housing for distributing discrete fibers across said bottom wall, (C) a foraminous forming surface immediately below said bottom wall, (D) a suction box connected with the underside of said foraminous surface and extending substantially along the entire length and width of said permeable bottomwall, (E) a plurality of rollers positioned under said foraminous surface and within the confines of said suction box, each roller being in substantial contact with said foraminous surface and (F) a plurality of damper means positioned within the confines of said suction box each adjacent to one of said plurality of rollers, each of said damper means comprising a blade adapted to contact its adjacent roller and an adjustable bar which functions to modify the space between its roller and its next adjacent member while maintaining the blade in contact with the roller.

Figure 1:
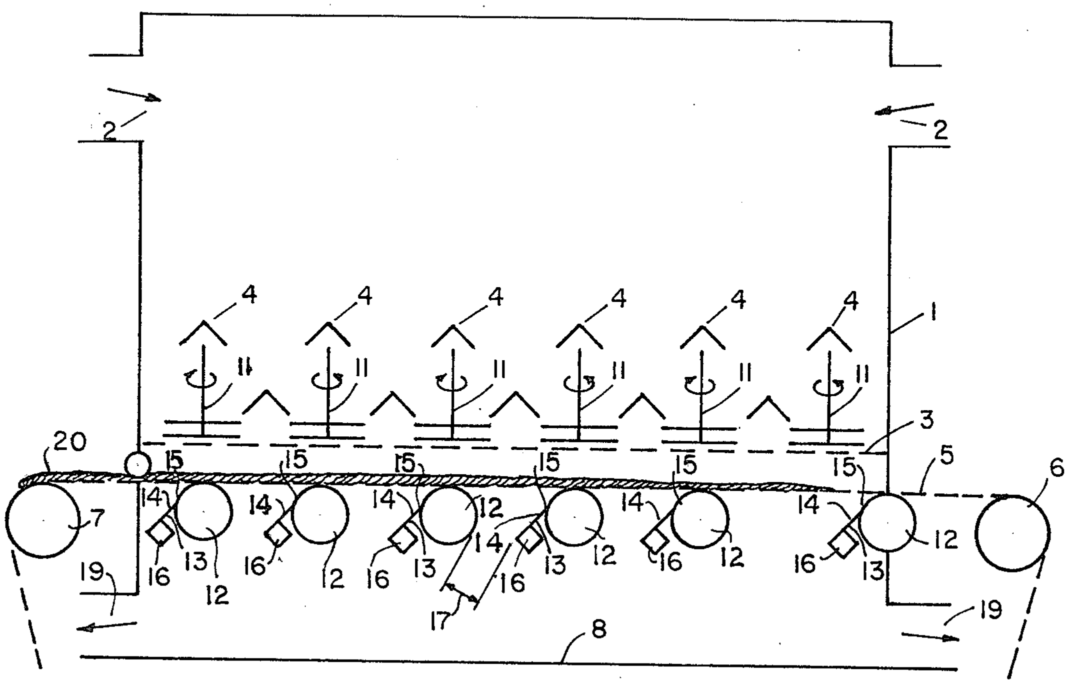
FIG. 1 is a side schematic view of the apparatus of the present invention with particular emphasis on the unique damper structure thereof.

With reference to the drawings, particularly FIG. 1, a distributor housing 1 having inlets 2 for admitting air fiber and resin and a permeable, bottom wall 3, is shown. Within the housing is positioned a plurality of distributor means 4, shown as six in number. Below said bottom wall is a foraminous forming surface comprising endless belt 5 which winds around feeding means 6 and 7. Suction box 8, is positioned below the endless belt 5 and extends along the entire length and width of said permeable bottom wall 3. Distributor means 4, individually, comprises stirrers 11, a plurality of which are positioned closely adjacent one another across the apparatus in the non-machine direction. Only the outer stirrer is shown for purposes of clarity and brevity. A plurality of rollers 12 are positioned abutting the underside of endless belt 5 within the confines of suction box 8. In one typical embodiment, each roller 12 is substantially beneath a corresponding distributor means 4. Damper means 13 are also positioned within the suction box 8, each adjacent one of the rollers 12 Each damper means 13 is comprised of a blade 14 which is in contact with its adjacent roller at point 15. Support member 16 is attached to the other end of blade 14 and is mounted on pivot lever 21 which may be rotated about axis 22 to thereby reduce or increase the gap 17 between each roller and its next adjacent member as shown more fully in FIG. 2 $g^1$, $g^2$, and $g^3$ while maintaining point 15 of blade 14 in contact with roller 12.

Typically there are six distributor means, six rollers and six dampers although any number thereof can be employed herein. Additionally, only one housing 1 is shown although each individual distributor means 4 may have its own housing and still function in accordance with the present invention.

In operation, air is fed into the distributors 4 of the apparatus via inlets 2 alone or in conjunction with fiber and resin. Stirrers 11 are started, each cross-machine row thereof rotating in alternate opposite directions, causing fiber and resin to pass through permeable wall 3 and onto endless belt 5. Suction from suction box 8, sourced from an appropriate generator, not shown, holds the forming web on the wire. Air, resin and fiber are exhausted through vents 19. Damper means 13 are adjusted so as to allow passage of an appropriate amount of air through the web as it forms, the dampers of the apparatus being set to apply appropriate resistance to the air flow. Rollers 12 are cleaned at point 15 by the edge of blade 14. Completely formed web is removed at 20 and is ready for any post-treatment required such as compaction, segmentation etc.

Figure 2:
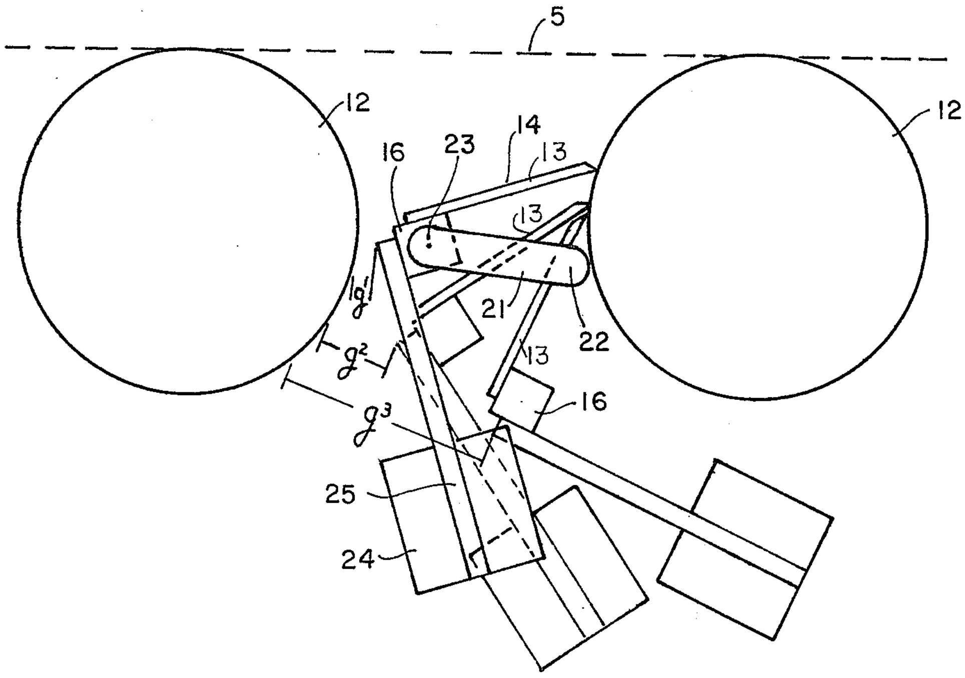
FIG. 2 is a detailed view of a damper of the apparatus of FIG. 1 in various positions of set.

With reference to FIG. 2, damper means 13 is illustrated in three positions with gap 17 shown in the three instances as $g^1$, $g^2$ and $g^3$. The apparatus has two levers at each side thereof, lever 21 being shown at the position of the damper means where the gap 17 is at its minimum. The lever 21 is pivoted about axis 22 and the damper means is mounted pivotally about the lever 21 on axis point 23. A counterweight 24 is attached to the end of the damper means 13 via rod 25.

It is readily apparent that as damper means 13 is moved pivotally about roller 12, blade 14 remains in contact therewith in order to perform its function of keeping the roller free of fiber, resin, dirt etc. At the same time, gap 17 is increased to enable a higher degree of suction on the endless belt 5 that passes just above the rollers.

When the apparatus of FIG. 1 is operated with no dampers at all or with all dampers fully open, the velocity of the air through the wire, in m/s, was 0.8, 3.4, 2.4, 1.9, 1.6 and 1.5 respectively, through each distributor in the machine direction, however, when the dampers were adjusted so as to equate the air velocity in each distributor zone, the readings were 1.6, 1.5, 1.3, 1.1, 1.15 and 1.2, respectively.

We claim:

1. In an apparatus for the production of a fibrous webbed product comprising (A) a distributor housing having an inlet and a perforated, bottom wall, (B) a plurality of distributor means within said housing for distributing discrete fibers across said bottom wall, (C) a foraminous forming surface immediately below said bottom wall, (D) a suction box connected with the underside of said foraminous surface and extending substantially along the entire length and width of said permeable bottom-wall and (E) a plurality of rollers positioned under said foraminous surface and within the confines of said suction box, each roller being in substantial contact with said foraminous surface, the improvement which comprises (F) a plurality of damper means positioned within the confines of said suction box each adjacent to one of said plurality of rollers, each of said damper means comprising a blade adapted to contact its adjacent roller and an adjustable bar which functions to modify the space between its roller and its next adjacent member while maintaining the blade in contact with the roller.

2. An apparatus according to claim 1 wherein there are six distributor means.

3. An apparatus according to claim 2 wherein there are six rollers.

4. An apparatus according to claim 3 wherein the six rollers each have a damper means in conjunction therewith.

* * * * *